(No Model.) 2 Sheets—Sheet 1.
J. EARLE.
METHOD OF ENGRAVING SCRIPT.
No. 260,464. Patented July 4, 1882.
Fig. 1.
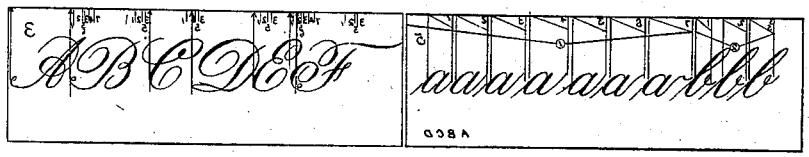
Fig. 2.
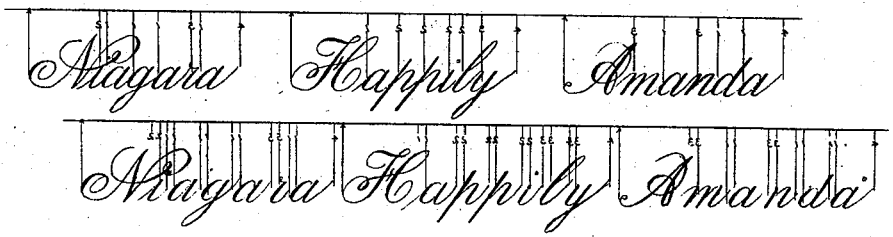
Fig. 3.
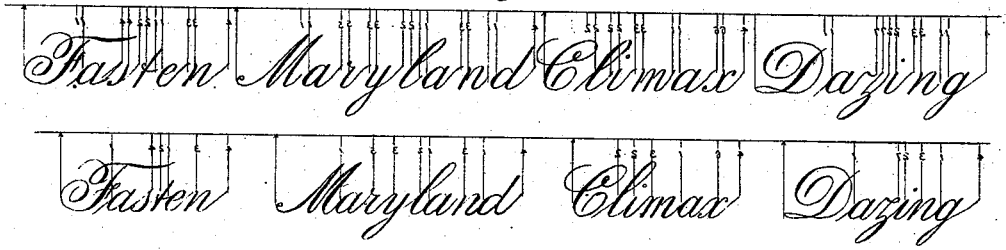
Fig. 4.
Attest:
F. H. Schott
A. R. Brown.
Inventor:
John Earle
J. C. Fastewalty (No Model.)
2 Sheets—Sheet 2.

J. EARLE.
METHOD OF ENGRAVING SCRIPT.

No. 260,464.   Patented July 4, 1882.

Fig. 5.

Attest:
F. H. Schott
A. R. Brown

Inventor:
John Earle

UNITED STATES PATENT OFFICE.

JOHN EARLE, OF DARBY, PENNSYLVANIA.

METHOD OF ENGRAVING SCRIPT.

SPECIFICATION forming part of Letters Patent No. 260,464, dated July 4, 1882.

Application filed December 29, 1881. (No model.)

*To all whom it may concern:*

Be it known that I, JOHN EARLE, a citizen of the United States, residing at Darby township, in the county of Delaware and State of Pennsylvania, have invented certain new and useful Improvements in Methods of Engraving Script, of which the following is a specification, reference being had therein to the accompanying drawings.

My invention relates to the production of script letters by means of tracing with a diamond or other suitable point from a given pattern through an etching-ground laid upon the surface of the plate to be engraved upon, and then subjecting the surface of the plate laid bare by the said point to the action of a suitable acid.

The invention consists in the method of classifying and arranging script letters for engraving and merging the same in the formation of words, as hereinafter set forth.

This invention is fully illustrated in the accompanying drawings, in which Figure 1 represents a diagram illustrating my improved classification of the small script letters. Fig. 2 is an engraved pattern-plate. Figs. 3 and 4 are pattern-plates, representing jointly a series of seven different words, illustrating the several class combinations of the small script letter *a*, and showing the manner in which letters are merged in the formation of words; and Fig. 5 represents a scale containing all the spacing-lines of capitals, small letters, and numerals.

The twenty-six small letters of the script alphabet, as shown in Fig. 1, are divided according to the similarity of their form to the left or on the left side of the letter into classes, of which I prefer making seven the number. Each letter of a class has drawn from a uniform position in relation to the letter on its left side a perpendicular line to the upper edge of the pattern-plate, Fig. 2, and these lines are marked with the number of the class to which the letters belong, as previously determined.

In order to space the small letters with each other a sufficient number of each letter is provided, each of which is provided with a different hair-line, from the extremity of which a perpendicular line is drawn and numbered to agree with the class-line number of any other letter with which it is to connect by causing the two lines to merge. (See Figs. 3 and 4.)

The capital letters have spacing-lines on the upper margins of their plates numbered to agree with the class-lines of the small letters with which they space, and are spaced with them by making their respective lines to merge, Figs. 2, 3, and 4.

To space words with each other according to my method, the final letter of each word must be the one having the class 4 or *s* hair-line, as this line is longer and finishes better than the others, besides furnishing a uniform point from which to space for the following word. For this purpose a scale is provided, (see near center of bottom edge of Fig. 5,) which scale is employed by making the line drawn on it and marked "*s* hair-line" agree or merge with the perpendicular line drawn from the extremity of the hair-line of the terminal letter and then marking from the scale the position of the line agreeing in number with the class-line of the first letter of the succeeding word, then causing the class-line of that letter to agree or merge with it. When a word ends with an *s* the line on the scale marked "*s* line" is used to measure from instead of the line marked "*s* hair-line," and proceed as before. When the succeeding word begins with a capital letter it is spaced with the preceding word by making the arrow-line indicating the extreme left side of the capital agree or merge with the perpendicular line drawn from the terminal or *s* hair-line of the preceding word, or, if that word end with an s, the space on the scale from the *s* hair-line to the *s* line is added.

Fig. 2 is a reduction of two plates of a series containing all the letters and numerals necessary to produce any combination of words and figures. The plates are engraved on both sides. Figs. 3 and 4 represent jointly a series of seven different words, illustrating the seven different class combinations of the small letter *a* on one of the plates, Fig. 2. Fig. 5 is a reduction of the scale, containing in a condensed form all the spacing-lines of capitals, small letters, and numerals, and is engraved on both sides.

In engraving a large body of script the letters, with their spaces, are laid out by marking with a pencil the space occupied by each successive letter from the scale, Fig. 5, on a continuous strip of any suitable material until all the matter is laid out. The strip or ribbon is then divided into as many lengths as there are desired lines. When the divisions are made, and it is found that some of them come in the middle or beyond the end of a word, the proper uniform length can be had by stretching the strip or ribbon, and so justifying or making such a gradual disposition of the increased space as not to be observed.

The engraving may be accomplished by means of a suitable tracing or engraving machine, having a diamond or other point adapted to make the desired impression through an etching-ground laid upon the surface to be engraved, any suitable acid being employed to deepen the lines. The central line or lines in the body-strokes of the letters as formed by the diamond or other point are made to bite together by the action of the acid, thus avoiding the necessity of cutting out the metal by hand.

Having thus described my invention, what I claim as new, and desire to secure by Letters Patent, is—

1. The herein-described method of classifying and arranging script letters for engraving the same in the formation of words, consisting in dividing the letters into classes according to the similarity of their form, providing said letters with varying hair-lines and drawing perpendicular lines from a uniform position in relation to the letter and its hair-line, whereby the letters may be uniformly merged and spaced in the formation of words and sentences by means of a suitable engraving apparatus, substantially as set forth.

2. The engraved scale containing in a condensed form all the spacing-lines of capitals, small letters, and numerals, whereby the proper letters and spacing can be laid out upon a continuous band, strip, or ribbon of any suitable material, substantially as described.

In testimony whereof I have affixed my signature in presence of two witnesses.

JOHN EARLE.

Witnesses:
JNO. TAYLOR,
A. B. EARLE.